Oct. 18, 1955    M. E. CHANDLER ET AL    2,720,752
TURBO-JET ENGINE CONTROL

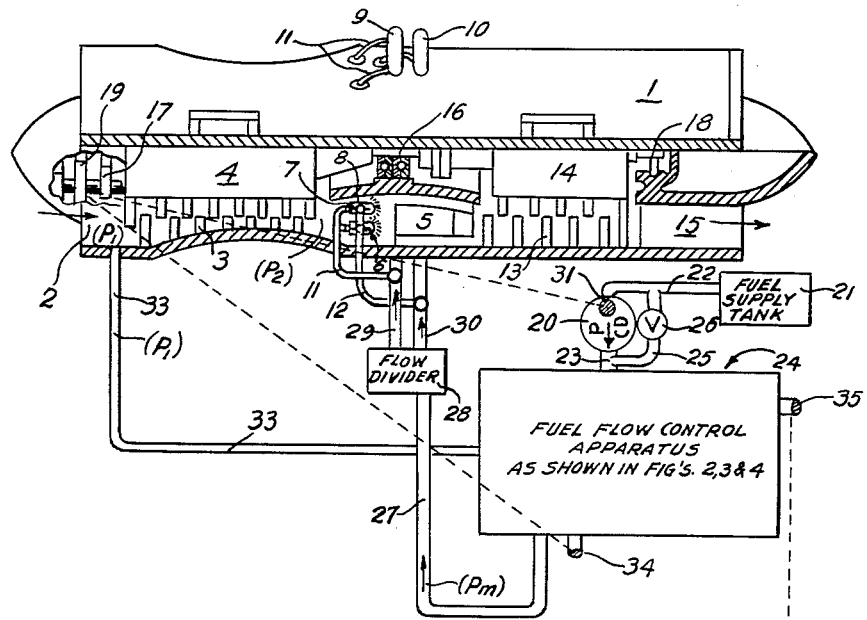
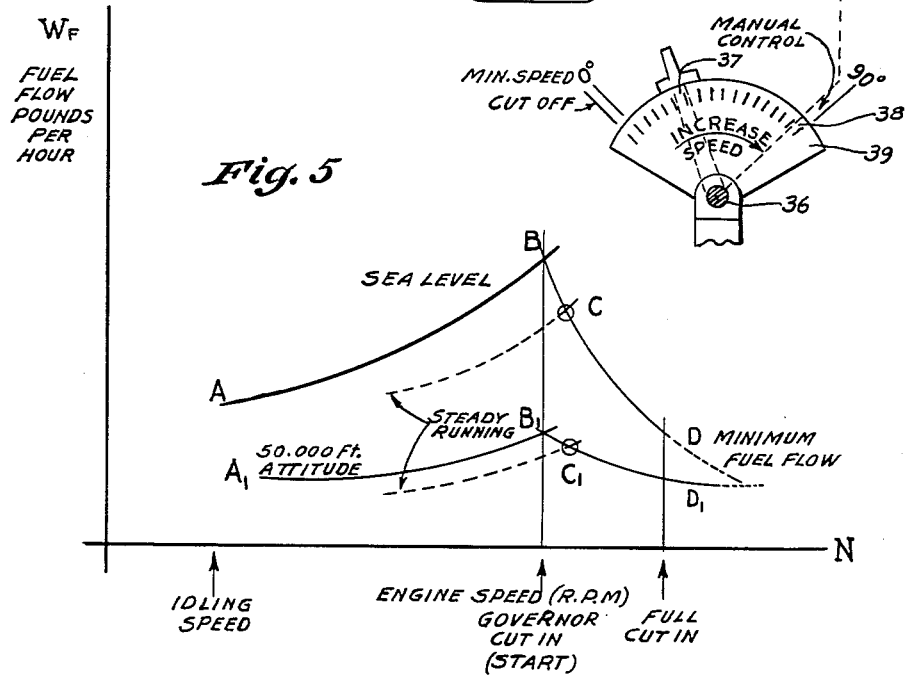

Filed Feb. 10, 1950    4 Sheets-Sheet 4

FULL GOVERNOR CUT-IN CURVE

INVENTORS
M. E. CHANDLER
A. M. WRIGHT
BY
ATTORNEY

United States Patent Office 2,720,752
Patented Oct. 18, 1955

2,720,752

TURBO-JET ENGINE CONTROL

Milton E. Chandler, New Britain, and Alexander M. Wright, West Hartford, Conn., assignors to Niles-Bement-Pond Company, West Hartford, Conn., a corporation of New Jersey Application February 10, 1950, Serial No. 143,546

28 Claims. (Cl. 60—39.28)

This invention pertains to automatic fuel and speed control apparatus for aircraft turbo-jet engines and more particularly has reference to fuel and speed controls for turbo-jet engines for use in pilotless aircraft.

The invention is especially applicable to turbo-jet engines for the propulsion of pilotless aircraft which must frequently be regarded as expendable. Such engines should be of the simplest and least expensive construction to perform the required functions and usually include an air inlet, an air compressor, one or more combustion chambers, a gas turbine, and a tail pipe for discharging combustion gases to the atmosphere. Associated with these engines is a fuel system including a pump for delivering fuel to the combustion chambers. This invention concerns apparatus to control the engine speed and power by regulating the fuel supply as a function of a manual control and several variables, including atmospheric density, engine speed, and other engine operating conditions.

Owing to structural and metallurgical limitations, engines of the type referred to cannot be safely operated at speeds and temperatures exceeding predetermined limiting values, but for maximum economy of operation, both engine speed and temperature must be maintained at or near these limiting values. On the other hand, while engine speed is a critical factor in flight performance of aircraft, an engine cannot be operated at maximum speed in all flight maneuvers, at all flight speeds, or under all flight conditions. Fuel control apparatus should, therefore, permit the engine speed and power to be varied as desired from a required minimum to the predetermined limit of speed and power. The control of engine temperature is preferably an automatic function of the fuel control apparatus, during transient and maximum speed conditions.

The value of engine speed corresponding to any given value of fuel flow, varies as a function of the speed of flight, air density at the engine air inlet, engine torque, fuel quality, and a wide variety of other factors. Therefore, for precise regulation of engine speed, or to avoid excessive engine temperatures, it is not feasible to rely solely upon automatic regulation of fuel flow as a function of variables which exclude engine speed and air density.

The objects of this invention are to provide:

Improved fuel and speed control apparatus comprising, in a single self-contained package, an engine-driven, constant delivery fuel pump, and a plurality of coordinated hydraulic systems for regulating fuel delivery from said pump to the engine; said systems being responsive to a single manual control and to air density, pressure and speed conditions of the engine.

An improved fuel control system, wherein the fuel regulating apparatus operates in its own fluid (fuel) and acts directly on the fuel supplied to the engine by a constant delivery pump and regulates its flow by means of a suitably controlled by-pass valve.

An improved fuel control apparatus which produces a substantially constant engine speed, corresponding to the selected position of a single manual control lever, under all steady state engine operating conditions.

A control which functions so that the engine can be accelerated and decelerated at a maximum rate, corresponding respectively to the maximum temperature permissible ahead of the turbine, and to the minimum fuel flow corresponding to burner blowout conditions. In addition, the fuel flow is never great enough to cause stalling of the compressor.

An improved control apparatus wherein the fuel flow to the engine is regulated by:

(1) A fixed metering orifice; and
(2) A metering head across said orifice which:

(a) During engine acceleration, varies in accordance with the pressure of the air entering the engine compressor and the speed of the engine;

(b) During steady state engine operation, is controlled by a centrifugal speed governor of the "proportional" type, geared to the engine, whose action provides substantially constant engine speed (R. P. M.) at all altitudes (air densities), except as modified by an automatically decreasing schedule of R. P. M. with increasing altitude; and (c) During engine deceleration, is controlled by a constant rate spring.

In a speed and fuel control apparatus, improved means for insuring that the above mentioned control functions will be reliably performed by an apparatus of the simplest type and least expansive construction.

With these and other objects in view which may be incident to our improvements, our invention consists in the combination and arrangement of elements hereinafter described and illustrated in the accompanying drawings, in which:

Figure 1 shows, somewhat diagrammatically, a turbo-jet engine suitable for propulsion of aircraft, together with its associated fuel flow apparatus, operating in conjunction with a constant displacement fuel boost pump and manual control lever, and the principal connections therebetween;

Figures 5 and 6 are diagrams showing certain performance characteristics of our improved control apparatus.

Figure 2:
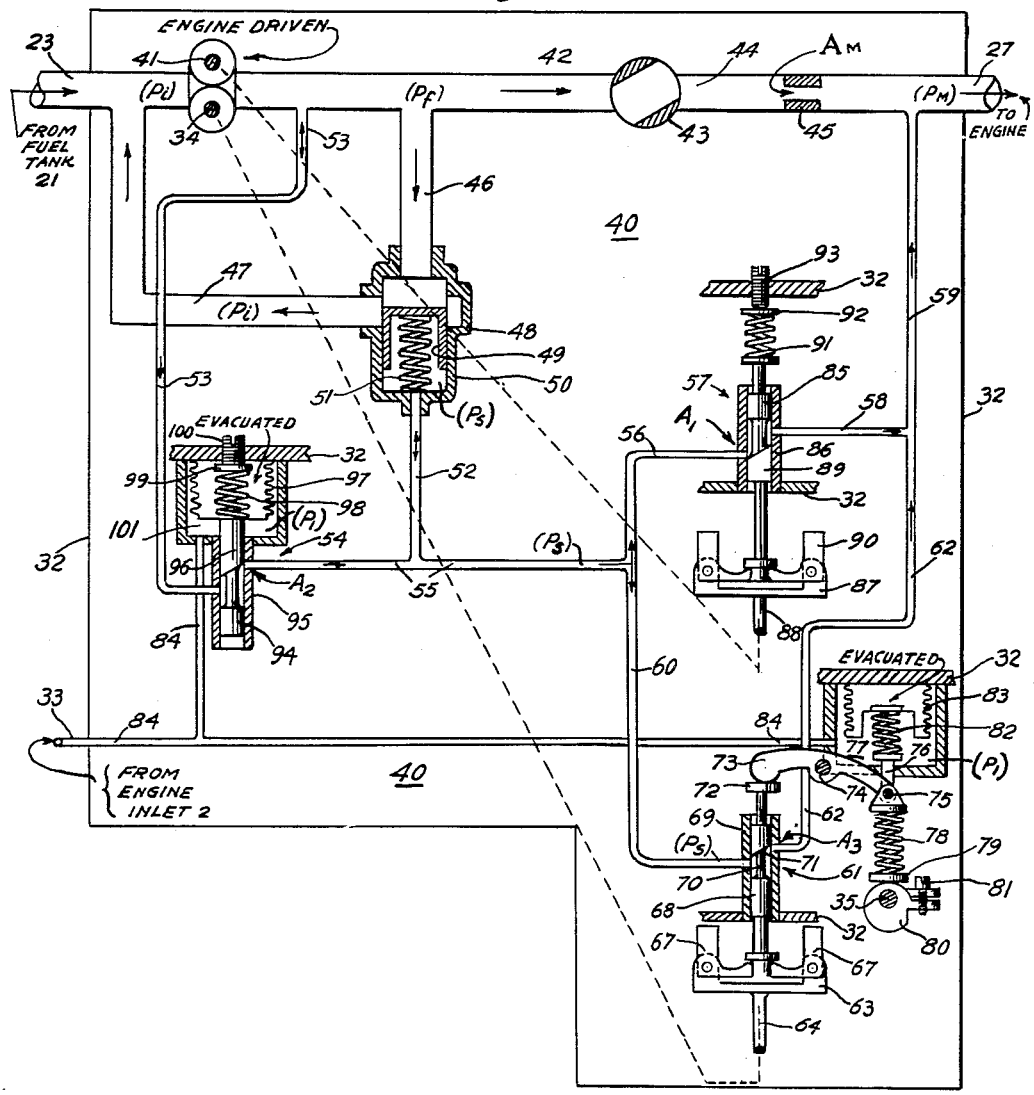
Figure 2 shows, also somewhat diagrammatically, a control apparatus embodying the principles of our invention.

Broadly comprehended, our invention comprises a fuel pump and a fuel and speed control apparatus for a turbo-jet engine, combined in one self-contained package, which regulates the delivery of fuel to the engine from a constant pressure fuel source under all required engine operating conditions. The fuel flow to the engine is metered across a fixed area restriction (which may be the fuel burner nozzles of the engine), the metering pressure differential being varied according to specified engine requirements as a joint function of engine speed and compressor inlet air pressure.

The fuel control apparatus comprises the following elements for control of the engine:

(a) Speed governor
(b) Fuel shut-off valve
(c) Relief valve
(d) Acceleration control
(e) Deceleration control
(f) Altitude compensation Referring now to Figure 1 of the drawings, there are shown, as the principal elements of the engine above referred to: a supporting casting 1, an air inlet 2, a multistage air compressor 3, a compressor rotor shaft 4, one each of a number of combustion chambers 5; a series of combustion nozzles 6, each having a fixed slot 7 and an auixiliary slot 8, connected respectively to two generally circular fuel manifolds 9 and 10, by means of conduits 11 and 12, a multistage gas turbine 13, a turbine rotor shaft 14, connected to the compressor rotor shaft 4; a tail pipe 15 for discharging exhaust gases from gas turbine 13; a center bearing 16 and end bearings 17 and 18, supported by casing 1; and a gear train 19, connected to shaft 4 for operating the fuel pump and other accessories. The construction of a turbo-jet engine used for propulsion of pilotless aircraft is similar to that for a turbo-jet engine used in piloted aircraft, except for the omission of certain elements not required by the former and the substitution of a robot pilot for a human pilot.

Figure 3:
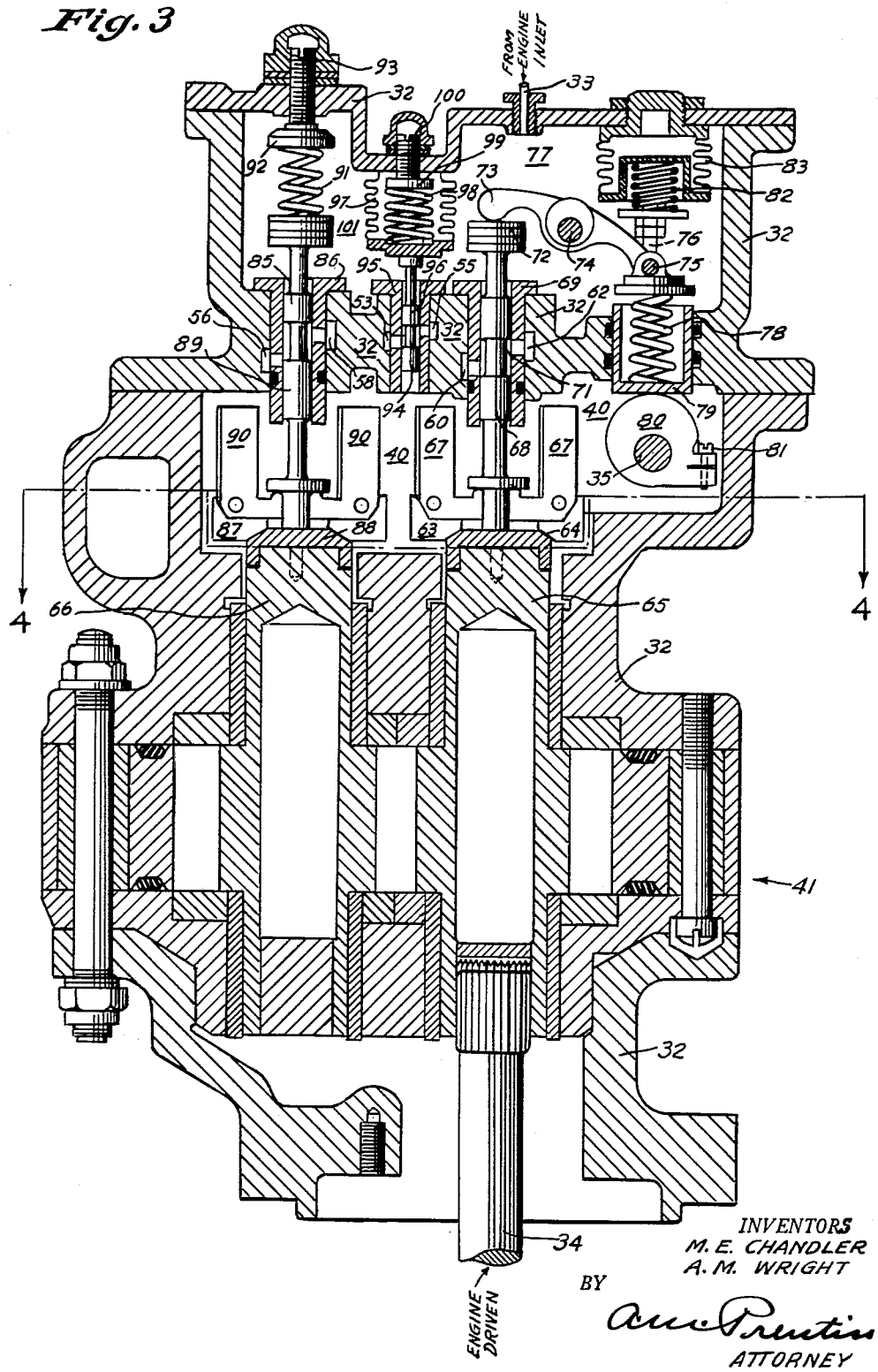
Figure 3 shows a cross section of a control apparatus according to Figure 2, along the line 3—3 of Figure 4.
Figure 4:
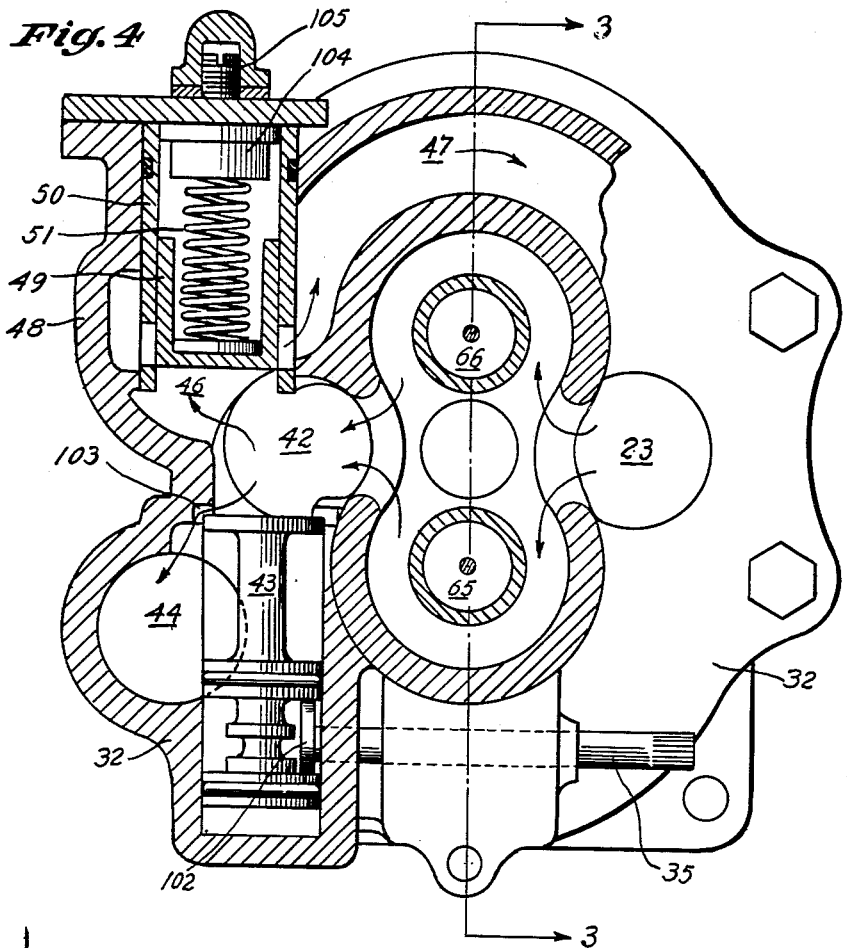
Figure 4 shows a cross section of the apparatus of Figure 3, along the line 4—4 of Figure 3.

A constant displacement fuel boost pump 20 draws fuel from a supply tank 21 through a conduit 22, and delivers it through a conduit 23 to the fuel flow control apparatus, diagrammatically indicated at 24, and shown in detail in Figures 2, 3 and 4. A by-pass conduit 25, controlled by a spring-biased relief valve 26, insures a substantially constant pressure in pump discharge conduit 23. From fuel control apparatus 24, the fuel flows through a conduit 27 to a pressure-responsive flow-divider 28, and from thence through conduits 29 and 30 to fuel manifolds 9 and 10, respectively, in the engine. Boost pump 20 is operated by a drive shaft 31 connected to gear train 19 in the engine, or to any other suitable source of power. The fuel control apparatus 24 acts to vary the quantity of fuel delivered to the engine per unit of time, as required by the operating conditions, and the difference between the fuel delivered by boost pump 20 and the quantity required by the engine is by-passed through conduit 25 and relief valve 26 to conduit 22 on the inlet side of the pump. In each of the combustion nozzles 6 there is a series of fixed slots, one of which is indicated at 7, through which fuel enters the nozzles 6 from conduit 11. The fuel flow from the nozzles is directly proportional to the effective area of slots 7 and is a square root function of the drop across the nozzles between the pressure in conduit 11, which is substantially equal to the pressure $(p_m)$ in conduit 29, and the pressure $(p_2)$ in the combustion chamber 5. As it is desired to limit the range of fuel pressures so that their value at maximum fuel flow is less than that corresponding to the square root function of the drop across slots 7, the nozzles 6 are provided with auxiliary slots 8 supplied by manifold 12 connected to the pressure-responsive flow-divider 28 which opens at a predetermined value of the pressure $(p_m)$ in conduit 27. In this manner, the pressure $(p_m)$ may be maintained sufficiently high to produce satisfactory nozzle discharge without requiring the fuel regulator 24 and boost pump 20 to operate under unfavorable pressure conditions at maximum flow.

The fuel flow control apparatus indicated as 24 in Figure 1, and shown diagrammatically in Figure 2, comprises a unitary, sealed casing 32, connected by a conduit 33 to engine air inlet 2, whereby the control apparatus 24 is made responsive to engine air inlet absolute pressure $(p_1)$ (ambient atmospheric absolute density), as subsequently explained. The value of $(p_1)$ increases as the speed of flight increases (ram effect), and decreases as the altitude of flight (atmospheric density) decreases, and is also a function of engine speed and compressor characteristics.

A main fuel pump drive shaft 34 in fuel control apparatus 24 is driven by the engine at a speed proportional to engine speed, and a manual control shaft 35 is oscillated in response to movement of a shaft 36, fixed to the engine control lever 37, which is manually (or robotly) operable in reference to a scale 38 on a fixed quadrant 39; said scale being calibrated in terms of engine speed (R. P. M.).

As shown diagrammatically in Figure 2, the control apparatus 24 is a self-contained hydraulic system employing the space in casing 32 as a reservoir 40 which is maintained approximately full of liquid fuel at an inlet pressure $(p_1)$, equal to the discharge pressure of boost pump 20, in order to permit the working elements to operate in a lubricating bath of fuel.

Referring first to Figure 1, liquid fuel is supplied from tank 21 through conduit 22, boost pump 20 and conduit 23 to control apparatus 24, under a substantially constant inlet pressure $(p_1)$ equal to the discharge pressure of pump 20. If preferred, boost pump 20 may be omitted and fuel supplied from tank 21 and conduit 22 direct to control apparatus 24, under a gravity head equal to inlet pressure $(p_1)$. As shown in Figure 2, fuel issuing from boost pump 20 flows through conduit 23 to a main fuel pump 41 which is of the conventional constant displacement gear or vane type, and is driven by drive shaft 34, connected to gear train 19 of the engine 1 (see Figure 1). From main pump 41, fuel flows through a conduit 42, a manual cut-off valve 43, conduit 44, fixed metering restriction 45 and conduit 27 to flow-divider 28, and thence to nozzles 6 in combustion chambers 5 of engine 1. Excess fuel from pump 41, not required by the engine, is returned to the inlet side of said pump, through by-pass conduits 46 and 47, which are connected through a relief valve 48 which serves to regulate the main pump discharge pressure $(p_f)$ in conduits 42 and 44. The excess fuel flow through relief valve 48, which regulates the pressure $(p_f)$ in conduits 42 and 44, is determined by a piston 49 slidably mounted in a cylinder 50 and biased toward closed position by a constant rate spring 51 and a variable control pressure $(p_s)$ supplied through a conduit 52 connected to the control pressure system, as hereinafter explained. The incorporation of the main fuel pump 41 as an organic unit of the fuel regulating apparatus 26, as shown in Figures 2, 3 and 4, is a substantial improvement over prior art arrangements, wherein the fuel pump and fuel control apparatus were separate units, since the combined (single package) construction herein disclosed not only eliminates connecting conduits and danger from leakage, but is also a more compact, lighter, simpler, and less expensive construction.

Paralleling main fuel passage 42, 43, 44, 45 and 27 is an auxiliary control fuel passage comprising: a conduit 53, an altitude control device 54 (having a variable orifice $A_2$), a conduit 55, a first branch conduit 56, an acceleration control device 57 (having a variable orifice $A_1$), and conduits 58 and 59; also a second branch conduit 60, a speed control device 61 (having a variable orifice $A_3$) and a conduit 62, which connects with conduit 55. This auxiliary control passage permits fuel to flow from conduit 42, under main pump discharge pressure $(p_f)$, through variable orifices $A_2$, $A_1$, and $A_3$, to conduit 27, where the pressure is the metered fuel pressure $(p_m)$. It will be noted from this arrangement that orifice $A_2$ is in series with orifices $A_1$ and/or $A_3$, and orifices $A_1$ and $A_3$ are in parallel with each other, so that the control pressure $(p_s)$ in conduit 55 depends upon the interrelation of the openings through orifices $A_2$, $A_1$, and $A_3$ at any one time.

The speed control device 61 comprises a centrifugal all-speed governor 63 whose drive shaft 64 is connected to driving rotor 65 of fuel pump 41 which in turn is connected by a drive shaft 34 to gear train 19 of the engine (see Figures 3 and 1), so that governor 63 is driven by the engine in constant speed ratio to engine speed and the speed of rotors 65 and 66 of pump 41. Pivotally mounted on governor 63 are a pair of centrifugal weight arms 67 which contact the lower end of a spool valve 68 so as to raise said valve as the engine speed increases, and vice versa. Spool valve 68 is slidably mounted in a fixed sleeve 69 to which conduits 60 and 62 are connected. Valve 68 has a central recess 70 and an upper land portion whose lower edge 71 is bevelled and adapted to progressively uncover the port of conduit 62 as valve 68 is raised by governor 63, and vice versa.

The upper end of valve 68 carries a disc 72 which contacts with a lever 73 pivoted at 74 to casing 32. The other end of lever 73 is pivotally connected at 75 with a stem 76 which is contained in an air-tight chamber 77. Stem 76 is biased upwardly by a spring 78 whose lower end seats on a disc 79 which contacts and follows the contoured edge of a cam 80, adjustably secured by a split collar and set screw 81 on manual control shaft 35. Stem 76 is also biased downwardly by a spring 82, interposed between the upper end of stem 76 and the lower movable end of an evacuated bellows 83, which is secured at its upper end to the top wall of chamber 77. A conduit 84 connects the interior of chamber 77 with conduit 33 which leads to engine air inlet 2, so that the interior of chamber 77 is always under air inlet pressure ($p_1$) which acts on the outside of bellows 83. Since the interior of bellows 83 is evacuated to zero pressure ($p_0$), the pressure differential ($p_1-p_0$) known as the compressor "sensing pressure," opposes the resilient force of bellows 83 and the net force of bellows 83, transmitted through spring 82, biases stem 76 and the right end of lever 73 in a downward direction, in opposition to the upward force of spring 78.

From the arrangement just described, it is apparent that as cam 80 is rotated, by the advancement of manual control lever 37, from its position of minimum throw (shown in Figure 2), to its position of maximum throw, spring 78 is progressively compressed and exerts an increasing upward thrust on the right end of lever 73, with a corresponding downward thrust of the left end of said lever on valve 68. The downward movement of valve 68 progressively closes the port of conduit 62, thereby reducing the flow of fuel through conduits 60 and 62 and correspondingly raising control pressure ($p_s$) in conduit 55, which pressure is transmitted by conduit 52 to the lower end of cylinder 50 where it augments the force of spring 51 and moves valve 49 towards closed position, thereby reducing the flow of excess fuel through valve 48, and correspondingly increasing the pressure ($p_f$) in conduit 42. Since the area ($A_m$) of fixed metering restriction 45 is constant, the rate of fuel flow to the engine is proportional to the pressure differential ($p_f-p_m$) across said restriction, and an increase in ($p_f$) in conduit 42 correspondingly increases the said fuel flow. Other factors being equal, engine speed varies directly with rate of fuel flow to the engine, so that a rotation of cam 80 in a throw-increasing direction correspondingly increases the speed of the engine. However, the effect of increasing engine speed is to throw weight arms 67 outwardly and exert an increasing upward thrust on valve 68 which continues until the upward thrust of arms 67 on valve 68 overcomes the downward thrust of the left end of lever 73 on said valve, whereupon said valve moves up, again increasing the port area $A_3$ of conduit 62, until the equilibrium of valve 68 is restored, whereupon condition of steady state engine speed ensues.

The same cycle of operation occurs, but in reversed sequence, whenever cam 80 is rotated in a throw decreasing direction. Also, the effect of an extraneous increase in engine speed (as from decreased load on the engine) is to move valve 68 up, in opposition to the upward force of spring 78, thereby opening port of conduit 62, decreasing control pressure ($p_s$) in conduits 60, 55 and 52, moving piston 49 downwardly, increasing by-passed fuel flow, decreasing fuel flow to the engine and decreasing the engine speed, until valve 68 is again in equilibrium, and the engine speed corresponds to the position of cam 80 and manual control lever 37. Thus, it follows that the speed of the engine will always be the same for any given position of manual control lever 37 after a transient condition is completed, except that a change in altitude automatically causes a corresponding opposite change in engine speed and there results an automatically decreasing schedule of engine speed (R. P. M.) with increasing altitude at any given position of the manual control lever 37.

The acceleration control device 57 comprises a spool valve 85, slidably mounted in a cylindrical sleeve 86 which is fixedly attached to casing 32 and connected by conduits 56 and 58, between conduits 55 and 59, in parallel with valve 68 of speed control device 61. Valve 85 is reciprocated by a centrifugal speed governor 87 which is connected by a drive shaft 88 to the driven rotor 66 of fuel pump 41 and is thus rotated in a constant speed ratio with the speed of the engine and the speed of pump rotors 65 and 66. Valve 85 is similar to valve 68, except that its lower land portion 89 is bevelled at its upper end and varies the port opening $A_1$ of inlet conduit 56. The upward thrust of weight arms 90 on valve 85 is opposed by a spring 91 which is interposed between the upper end of valve 85 and an adjustable seat 92 whose position is varied by a set-screw 93. Upon an increase in engine speed, weight arms 90 raise valve 85 against the force of spring 91 and decrease port opening $A_1$ of inlet conduit 56, and vice versa. A decrease in $A_1$ increases control pressure ($p_s$) in conduits 55 and 52 and cylinder 50 raises piston 49, decreases by-pass fuel flow and increases fuel flow to the engine, with corresponding increase in engine speed. Valve 85 will thus continue to be pushed up by arms 90 until the increasing force resulting from the compression of spring 91 balances the upward thrust of arms 90, whereupon valve 85 remains stationary in equilibrium in its elevated position. A similar action in reverse sequence occurs upon a decrease in engine speed. It is also clear that the speed (R. P. M.) at which valve 89 completely cuts off the port opening A of conduit 56 is determined by the loading of spring 91 by adjustment of set-screw 93.

The altitude control device 54, which compensates the rate of fuel flow to the engine for variations in flight altitude (i. e., ambient air density), comprises a spool valve 94 slidably mounted in a cylindrical sleeve 95 which is fixed to casing 32. Valve 94 has an upper land portion 96 whose lower edge is bevelled and adapted to vary the area $A_2$ of the port of conduit 55 upon reciprocation of said valve. The top of valve 94 is attached to the lower movable end of an evacuated bellows 97 whose upper end is fixed to the top wall of chamber 101. The resilient force of bellows 97 is augmented by a spring 98 interposed between the lower end of said bellows and a movable seat 99 whose position is adjusted by set-screw 100. Since chamber 77 is connected by conduits 84', 84 and 33 to engine air inlet 2, the interior of said chamber is under compressor air inlet pressure ($p_1$) which acts upwardly on the bottom of bellows 97 in opposition to the resilient force of said bellows and the force of spring 98.

From the arrangement just described, it is clear that as the altitude of flight increases, the pressure ($p_1$) in chamber 101 decreases and bellows 98 expands, moving valve 94 down and progressively reducing port area $A_2$ of conduit 55. This reduces the control pressure ($p_s$) in conduits 55 and 52 and cylinder 50, whereupon piston 49 moves down and increases the by-passed fuel flow through conduits 46 and 47, with corresponding decrease in pressure ($p_f$), fuel flow to the engine and engine speed. Conversely, a decrease in flight altitude similarly increases the fuel flow to the engine and engine speed, so that the fuel flow to the engine is thus automatically compensated for changes in flight altitude as reflected in changes in ambient air density.

In Figures 3 and 4, which show the actual construction of the preferred embodiment of our invention, the elements are identified by the same reference numerals as appear in Figure 2. In Figure 4, it will be noted that the fuel shut-off 43, shown in Figure 2 by the conventional rotary valve symbol, is acutally a reciprocating valve which is moved by a cam 102 attached to manual control shaft 35. The pitch and adjustment of cam 102 are such that valve 43 engages its seat 103 when control lever 37 (Figure 1) is retracted to its leftmost position, marked "cut-off" on scale 38; and when lever 37 is advanced to the position indicated as "minimum speed (0°)" on scale 38, valve 43 is moved away from its seat a sufficient distance to fully open communication between conduits 42 and 44. Hence, cut-off valve 43 serves only to completely cut-off fuel flow to the engine when the engine is not operating, and does not restrict communication between conduits 42 and 44 when control lever 37 is in any position from 0° to 90° on scale 38, which corresponds to the whole operating range of the engine.

It will also be noted from Figure 4, that the loading of relief valve spring 51 is adjusted by a movable seat 104 whose position is determined by a set-screw 105.

Operation

Referring to Figure 2, the main fuel pump 41, which is of the fixed displacement type, receives fuel from boost pump 20 under a substantially constant pressure ($p_1$) and discharges fuel at a variable pressure ($p_t$) which is regulated by by-pass valve 48, as indicated hereinabove and further explained below. The fuel not consumed by the engine escapes back to the inlet side of pump 41 through by-pass conduits 46 and 47, while the fuel consumed by the engine flows through the fixed metering orifice 45 and is delivered to the engine under metered fuel pressure ($p_m$). The pressure differential (or drop) across metering orifice 45 is therefore ($p_f - p_m$).

The metering characteristics of the system are shown by the following analysis.

The metering pressure drop ($p_f - p_m$) is given by $$(p_f - p_m) = (p_f - p_s) + (p_s - p_m) \quad (1)$$

where ($p_s$) is the control pressure in conduits 55 and 52 which actuates relief valve 48.

Now from the equilibrium of relief valve 48

$$(p_f - p_s) = F_r / A_r \quad (2)$$

where ($A_r$) is the area of the face of the relief valve, which is subjected to the pressure differential ($p_f - p_s$), and ($F_r$) is the force exerted by the relief valve spring 51. The relief valve piston 49 is designed to have a relatively short stroke, and the spring 51 is designed with a low rate, so that ($F_r$) is substantially constant at all times.

There is a small flow through orifices ($A_1$), ($A_2$) and ($A_3$) in the auxiliary control passage, denoted by ($q$): Then $$q = CA_2\sqrt{p_f - p_s} = C(A_1 + A_3)\sqrt{(p_s - p_m)} \quad (3)$$

so that $$(p_s - p_m) = \left[\frac{A_2}{A_1 + A_3}\right]^2 \times (p_f - p_s) \quad (4)$$

Substituting (4) in (1), we get the final expression for the metering head:

$$(p_f - p_m) = (p_f - p_s)\left(1 + \left[\frac{A_2}{A_1 + A_3}\right]^2\right)$$

$$= \frac{F_r}{A_r}\left(1 + \left[\frac{A_2}{A_1 + A_3}\right]^2\right) \quad (5)$$

Denoting the area of the metering orifice 45 by $A_m$, the fuel flow to the engine is given by $$W_f = CA_m\sqrt{(p_f - p_m)} = CA_m\sqrt{\frac{F_r}{A_r}\left(1 + \left[\frac{A_2}{A_1 + A_3}\right]^2\right)} \quad (6)$$

From Equation 6, it appears that the fuel flow is a function of the control system constants only, and is independent of the pump capacity and of the characteristics of the fuel burner nozzles 6 (except when these are used as the metering orifice).

Figure 2 shows that $A_2$ decreases with compressor inlet pressure, $A_1$ decreases with engine R. P. M., while $A_3$ remains at zero until the engine speed, selected by the position of manual control lever 37 and cam 80, is reached.

Let $$A_1 = f_1(N)$$

$$A_2 = f_2(N)$$

where $f_1$ and $f_2$ are functions of engine speed (N).

Then during acceleration when $A_3 = 0$, Equation 6 becomes $$W_f = CA_m\frac{F_r}{A_r}\sqrt{1 + \left[\frac{f_2(p_1)}{f_1(N)}\right]^2} \quad (7)$$

The contours of the valves and ports $A_1$ and $A_2$ determine the functional relationships $f_1$ and $f_2$, and these contours in turn are such as to satisfy the engine requirements.

The shape of the acceleration fuel flow curves are as shown by curves AB and A'B' in Figure 5.

The orifice $A_3$ in Figure 2 is closed until the speed corresponding to the setting of spring 78 by cam 80 is attained. This speed is called "governor cut-in speed." At the governor cut-in speed, the flyweights 67 of the governor 63 begin to overcome the force of speeder spring 78, and the governor stem 68 begins to rise, opening the valve orifice $A_3$. As the orifice $A_3$ increases in area, Equation 6 shows that the fuel flow ($W_f$) decreases, other things remaining fixed.

After the beginning of governor cut-in, therefore, the fuel flow decreases according to the curves BD and B'D' shown in Figure 5. The decrease in fuel flow continues until the orifice $A_3$ attains its maximum value as fixed by the design. The R. P. M. at which this occurs is the R. P. M. at "full governor cut-in."

If the opening of orifice $A_3$ were by some means to increase further, the fuel flow would continue to decrease until the quantity ($A_2/A_1 + A_3$) in (6) becomes very small. This corresponds to the minimum fuel flow of the control apparatus which Equation 6 shows to be determined principally by the force ($F_r$) of relief valve spring 51 and the area ($A_r$) of the face of the relief valve 49, in conjunction with the area ($A_m$) of the main metering orifice 45.

To obtain a small minimum fuel flow, as might be required for high altitude operation, both ($F_r/A_r$) and ($A_m$) must be as small as possible, which in turn entails high metering pressures. With the fuel control apparatus disclosed herein, such high altitude operation would become practical by metering the fuel across the burner nozzles 6, in which case the pressure ($p_m$) becomes equal to the compressor discharge pressure ($p_2$).

Curves ABD and A'B'D' in Figure 5 show the variation of fuel flow during automatic acceleration and deceleration at sea level and at altitude.

The lines AB and A'B' represent the accelerating fuel flow as determined by the R. P. M. and the barometric pressure. At points B and B', the governor cuts in to reduce the fuel flow. The fuel requirement for steady running is shown by the dotted curves, and after the governor starts to reduce fuel flow with increasing speed, the points C and C' will be reached at which the flow output of the control apparatus is equal to the engine requirement. This is the steady running speed for the particular ambient air conditions that prevail.

Figure 6:
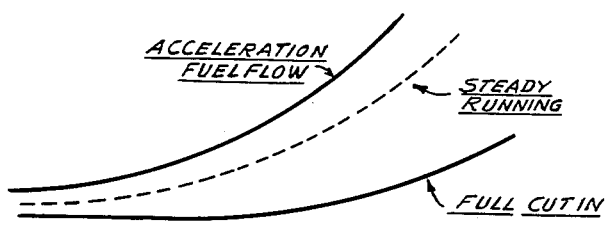

The curve of "full governor cut-in" versus compressor inlet sensing pressure ($p_1$) is shown in Figure 6. It is to be noted that at low values of compressor sensing pressure ($p_1$), the full cut-in fuel flow is almost equal to the acceleration and steady running fuel flow. Such a feature is valuable in permitting an increasing schedule of idling speed with altitude, and in limiting the deceleration fuel flow at high altitudes, which helps to prevent burner blowout at altitude after rapid throttle retardation.

The curves BD and B'D' of Figure 5, showing the reduction in fuel flow with increasing speed after the start of governor cut-in, may be approximated by a straight line over most of the working range, and under this approximation such a line may be represented by the equation $$W_f = k_1(N_1 - N) \qquad (8)$$

where $N_1$ is the desired speed and $N$ is the actual speed at any instant. Thus, the fuel flow permitted by the governor is proportional to the speed error $(N_1 - N)$, and this type of governing is known as "proportional."

The fuel requirement for steady running of the engine is shown by the dotted curves in Figures 5 and 6, and can be approximated by the formula $$W_{fr} = a_0 + a_1 N \qquad (9)$$

where $a_0$ is the minimum fuel flow for steady running and $a_1$ is the additional fuel flow required for acceleration to any speed $N$.

The acceleration of the engine can thus be considered as proportional to the excess fuel over that required for steady running; that is $$\frac{dN}{dt} = k_0(W_f - W_{fr}) \qquad (10)$$

Substituting the values of ($W_f$) and ($W_{fr}$) from (8) and (9) in (10), the equation of motion is obtained:

$$\frac{dN}{dt} = k_0[k_1(N_1 - N) - (a_0 + a_1 N)] \qquad (11)$$

The solution of this equation is $$N = \frac{k_1 N_1 - a_0}{k_1 + a_1} - C \cdot e^{-k_0(k_1 + a_1)t} \qquad (12)$$

where $C$ is a constant of integration.

The final speed is obtained after the transient dies out, and is equal to $$N_e = \frac{k N_1 - a_0}{k_1 + a_1} \qquad (13)$$

Equation 12 contains no oscillatory component, and therefore no overshooting of the R. P. M. will occur after a speed change. However, as shown by Equation 13, the final equilibrium speed is less than the desired speed ($N_1$). The difference ($N_1 - N$) represents the permanent error, or droop, of the speed governor.

Referring again to Figure 5, it is seen that the steady state running point (C) does not occur on the same droop curve at all conditions of load, but that the droop curve changes with ambient air conditions. It is also seen from Figure 5, that the equilibrium or steady running points (C) and (C), occur at nearly the same R. P. M. The speed change, due to a load change—as occurs in changing the altitude of the airplane—is therefore less than is indicated by the droop characteristic of the governor. The unit, therefore, approximates isochronism of speed due to the change in the droop characteristic with changing R. P. M.

Having now shown and described the preferred embodiment of our invention, we desire it to be understood that we do not limit ourselves to the details of construction disclosed by way of illustration, as these may be changed and modified by those skilled in the art without departing from the spirit of our invention or exceeding the scope of the appended claims.

What we claim is:

1. A fuel and speed control apparatus for a turbojet engine having a manual control lever, an air compressor, and a source of fuel under pressure for supply to said engine; comprising a fuel pump connected to said source and engine, a fixed area fuel metering orifice in said apparatus for metering the fuel flow through said connection between said source and engine; means for varying the metering head across said orifice in accordance with the position of said manual control and as a joint function of engine speed and compressor inlet air pressure; an all-speed governor driven by said engine, and means for modulating the speed responsive action of said governor in accordance with ambient air density.

2. A fuel and speed control apparatus for a turbojet engine having a manual control lever, an air compressor, and a source of fuel under pressure for supply to said engine; comprising a fuel pump connected to said source and engine, a fixed area fuel metering orifice in said apparatus for metering the fuel flow through said connection between said source and engine; means for varying the metering head across said orifice in accordance with the position of said manual control and as a joint function of engine speed and compressor inlet air pressure; an all-speed governor, and hydraulic means for stabilizing the speed responsive action of said governor by reducing said fuel flow with increasing engine speed, so that said fuel flow is proportional to the difference between actual engine speed at any instant and desired engine speed, as called for by the position of said manual control lever.

3. A fuel and speed control apparatus for a turbojet engine having a manual control lever, an air compressor, and a source of fuel under pressure for supply to said engine; comprising a fuel pump connected to said source and engine, a fixed area fuel metering orifice in said apparatus for metering the fuel flow through said connection between said source and engine; means for varying the metering head across said orifice in accordance with the position of said manual control and as a joint function of engine speed and compressor inlet air pressure; an all-speed governor, and means for varying said metering head, during deceleration of said engine, so that, at full governor cut-in, said fuel flow, as a percentage of acceleration fuel flow, varies inversely with ambient air density, whereby said fuel flow is never reduced during deceleration to a rate low enough to cause burner blowout.

4. A fuel and speed control apparatus for a turbojet engine having a manual control lever, an air compressor, and a source of fuel under pressure for supply to said engine; comprising a fuel pump connected to said source and engine, a fixed area fuel metering orifice in said apparatus for metering the fuel flow through said connection between said source and engine; means for varying the metering head across said orifice in accordance with the position of said manual control and as a joint function of engine speed and compressor inlet air pressure; and means for reducing said metering head, during acceleration of said engine, as a predetermined function of the sensing pressure of said compressor, whereby maximum permissible acceleration is automatically obtained at all altitudes without causing compressor stall or excessive turbine temperature.

5. A fuel and speed control apparatus, for a turbojet engine having a manual control lever and a source of fuel under pressure for supply to said engine; comprising: a fuel pump connected to said source and engine, and means for regulating the fuel flow from said pump to said engine so as to produce a constant, predetermined engine speed corresponding to each position of said manual control lever, under variable engine operating conditions; said regulating means including an all-speed governor, and means acting on said governor to vary its speed responsive action in accordance with ambient air density, whereby said fuel flow and hence engine speed is automatically varied directly with said air density, at any position of said manual control lever.

6. A fuel and speed control apparatus for a turbojet engine having an air compressor, a manual control lever, and a source of fuel under pressure for supply to said engine; comprising: a fuel pump connected to said source and said engine, a fixed area metering orifice, with a variable pressure differential thereacross in said apparatus for metering the fuel flow through said connection between said pump and engine, and a fuel control system comprising a fuel control passage in parallel with said orifice and a plurality of hydraulic devices connected to said passage for regulating the pressure in said passage, which pressure controls the pressure differential across said orifice; a first of said devices being responsive to said manual control, a second of said devices being responsive to said engine speed, and a third of said devices being responsive to a pressure in said engine.

7. A control apparatus according to claim 6, wherein two of said devices are connected in parallel with each other and in series with said third device.

8. A control apparatus according to claim 6, wherein each of said devices controls a variable orifice in said passage.

9. A control apparatus according to claim 6, wherein all of said devices jointly regulate a control pressure in said passage, which pressure varies the pressure differential across said orifice.

10. A control apparatus according to claim 6, wherein all the elements comprising said apparatus are incorporated within a single unitary casing.

11. A control apparatus according to claim 10, in which all of said elements work in a bath of fuel contained in said casing.

12. A control apparatus according to claim 6, wherein said first device is also responsive to engine speed.

13. A control apparatus according to claim 12, having means for making said first device also responsive to said engine pressure.

14. A control apparatus according to claim 6, wherein said engine pressure is compressor inlet air pressure.

15. A control apparatus according to claim 6, wherein said engine pressure is the compressor sensing pressure.

16. A control apparatus according to claim 6, wherein said pump is a constant capacity pump having a bypass relief valve which is responsive to the pressure in said control passage and regulates the pressure differential across said orifice.

17. A fuel and speed control apparatus for a turbojet engine having an air compressor, a manual control lever, and a source of fuel under pressure for supply to said engine; comprising: a fuel pump connected to said source and said engine, a fixed area metering orifice, with a variable pressure differential thereacross in said apparatus for metering the fuel flow through said connection between said pump and engine, and a fuel control system comprising a fuel control passage in parallel with said orifice and a plurality of hydraulic devices connected to said passage for regulating the pressure in said passage, which pressure controls the pressure differential across said orifice; said devices having means to so regulate said fuel supply as to secure maximum engine acceleration without causing compressor stall.

18. A fuel and speed control apparatus for a turbojet engine having an air compressor, a manual control lever, and a source of fuel under pressure for supply to said engine; comprising: a fuel pump connected to said source and said engine, a fixed area metering orifice, with a variable pressure differential thereacross in said apparatus for metering the fuel flow through said connection between said pump and engine, and a fuel control system comprising a fuel control passage in parallel with said orifice and a plurality of hydraulic devices connected to said passage for regulating the pressure in said passage, which pressure controls the pressure differential across said orifice; said devices having means to so regulate said fuel supply as to secure maximum engine deceleration without causing burner blowout.

19. A fuel and speed control apparatus for a turbojet engine having an air compressor, a manual control lever, and a source of fuel under pressure for supply to said engine; comprising: a fuel pump connected to said source and said engine, a fixed area metering orifice, with a variable pressure differential thereacross in said apparatus for metering the fuel flow through said connection between said pump and engine, and a fuel control system comprising a fuel control passage in parallel with said orifice and a plurality of hydraulic devices connected to said passage for regulating the pressure in said passage, which pressure controls the pressure differential across said orifice; one of said devices being operable to vary said pressure differential in accordance with movement of said manual control lever.

20. A control apparatus according to claim 19, wherein one of said devices includes means to also vary said metering head in accordance with compressor inlet air pressure and engine speed.

21. A control apparatus according to claim 19, wherein one of said devices includes means to vary said metering head in accordance with compressor sensing pressure.

22. A control apparatus according to claim 19, wherein one of said devices includes an engine speed governor of the proportional type.

23. A control apparatus according to claim 22, having means for modifying the action of said governor in accordance with ambient air density.

24. A control apparatus according to claim 22, having means for modifying the action of said governor in accordance with compressor inlet air pressure.

25. A control apparatus according to claim 22, having means for making the action of said governor responsive to said manual control.

26. A fuel and speed control apparatus, for an internal combustion engine having a manual control lever and a source of fuel under pressure for supply to said engine; comprising, in one unitary casing: a fuel pump connected to said source and engine, a plurality of coordinated hydraulic devices which jointly regulate the delivery of fuel from said pump to said engine; one of said devices being responsive to said manual control, another of said devices being responsive to engine speed, and a third of said devices being responsive to a pressure in said engine.

27. A control apparatus as in claim 26, in which the component elements of said apparatus work in a bath of fuel contained in said casing.

28. A control apparatus as in claim 26, in which said devices regulate the fuel supply to the engine so as to produce a constant engine speed, corresponding to the selected position of said manual control, under varying engine operating conditions.

References Cited in the file of this patent

UNITED STATES PATENTS

| 2,412,289 | Pugh et al. | Dec. 10, 1946 |
| 2,429,005 | Watson | Oct. 14, 1947 |
| 2,508,260 | Holley | May 16, 1950 |
| 2,538,582 | Mordell et al. | Jan. 16, 1951 |
| 2,560,118 | Malone et al. | July 10, 1951 |

FOREIGN PATENTS

| 920,524 | France | Jan. 4, 1947 |